United States Patent [19]

Sato

[11] Patent Number: 4,520,446

[45] Date of Patent: May 28, 1985

[54] APPARATUS FOR CONTROLLING A PLURALITY OF STUD TENSIONING DEVICES

[75] Inventor: Yoshinori Sato, Kanagawa, Japan

[73] Assignee: The Japan Steel Works, Ltd., Tokyo, Japan

[21] Appl. No.: 450,699

[22] Filed: Dec. 17, 1982

[30] Foreign Application Priority Data

Dec. 25, 1981 [JP] Japan .................. 56-209362

[51] Int. Cl.³ .............. G06F 15/52; B25B 29/02; C23F 15/00
[52] U.S. Cl. .................... 364/468; 364/506; 364/508; 29/709; 29/723
[58] Field of Search ................. 364/140–143, 364/146, 167, 171, 468, 481, 505–508, 550, 570–571; 29/703, 709, 711, 723, 757; 74/813 C; 73/1 R, 1 B, 1 C, 4 R, 760–763, 767, 811; 411/8, 13–14, 548

[56] References Cited

U.S. PATENT DOCUMENTS

| | | | |
|---|---|---|---|
| 3,657,926 | 4/1972 | Munson et al. | 73/1 C X |
| 3,895,517 | 7/1975 | Otto | 73/767 X |
| 4,075,923 | 2/1978 | Latham | 411/548 X |
| 4,244,245 | 1/1981 | Wallace et al. | 364/505 X |
| 4,259,869 | 4/1981 | Carlin | 73/761 |
| 4,265,011 | 5/1981 | LeBouc | 29/723 X |
| 4,267,629 | 5/1981 | Eshghy | 73/761 X |
| 4,390,953 | 6/1983 | Johnstone | 364/167 X |

FOREIGN PATENT DOCUMENTS

WO80/00672 4/1980 PCT Int'l Appl. .......... 29/723

*Primary Examiner*—Jerry Smith
*Assistant Examiner*—Gary V. Harkcom
*Attorney, Agent, or Firm*—Sughrue, Mion, Zinn, Macpeak & Seas

[57] ABSTRACT

An apparatus for automating the operation of a plurality of stud tensioning devices. A central control unit outputs a sequence of control signals, each of the control signals indicating an operative step to be completed by the stud tensioning devices. The next control signal is not sent out until a signal is produced which indicates that each of the stud tensioning devices have completed the preceding operative step. When the automatic operation is not continued due to break-down and undue slow-down in the operation of one of the devices, the automatic operation is temporarily interrupted, and the manually-operated switch is activated to return the mode to the automatic operation. Alternately, the other normal devices are automatically operated and thereafter, the malfunctioning device may only be examined.

5 Claims, 3 Drawing Figures

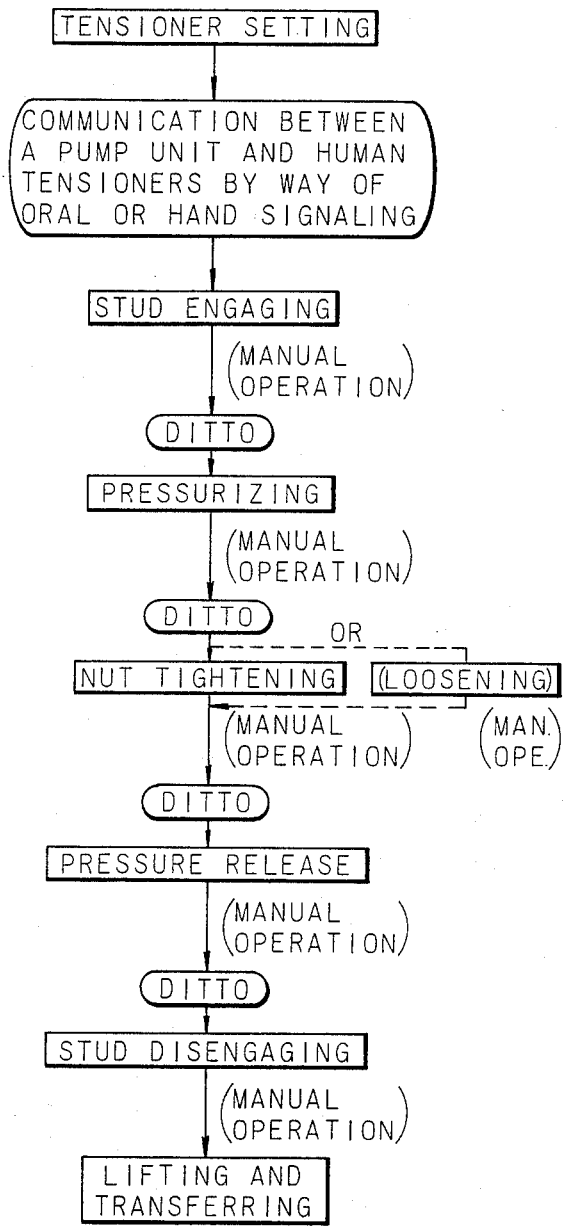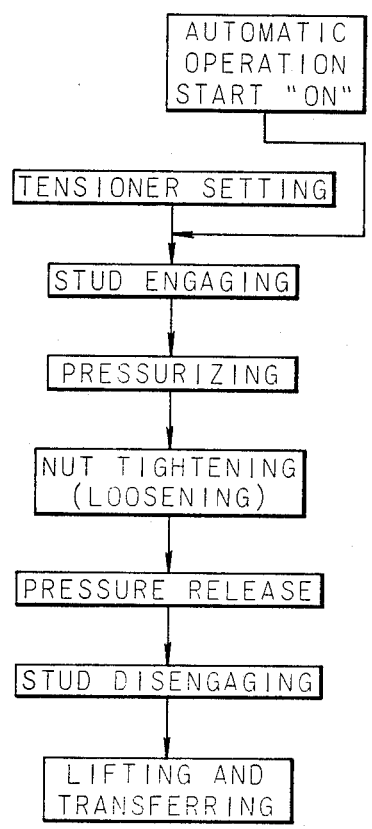
FIG. 1A PRIOR ART — MANUAL CONTROL
FIG. 1B — AUTOMATIC CONTROL

APPARATUS FOR CONTROLLING A PLURALITY OF STUD TENSIONING DEVICES

BACKGROUND OF THE INVENTION

The present invention relates to an apparatus for controlling a plurality of stud tensioning devices.

Stud tensioning devices are used to elongate a stud under tension to allow a nut to rotate thereon. When the tensile stress is subsequently removed, residual tensile stresses remain in the stud, wherein a first member is fastened by the nut to a second member having the stud affixed thereto. The stud tensioning device generally has an air or pneumatic cylinder for gripping the stud, a hydraulic cylinder unit for tensioning the stud, and a motor (such as an air motor) for rotating the nut. Such systems are typically used in nuclear reactor vessels.

Heretofore there has not been any control apparatus proposed in the art for automatically and simultaneously operating a plurality of stud tensioning devices for tensioning studs and rotating nuts thereon for fastening and loosening an upper cover of a nuclear reactor vessel. It has been a general practice in the art to assign a plurality of human operators to manually operate the stud tensioning devices. With reference to FIG. 1A, this manual control method is shown in flowchart form. Note that between each operative step, the pump unit (or supervisors) must monitor the operation and communicate to the operators by way of oral and hand signalling. This greatly increases the stud tensioning operation time. In addition, the operators are exposed to a high amount of radiation and suffer from undue fatigue. Furthermore, the operating costs of this prior art stud tensioning control method are high because a large number of operating steps is involved.

SUMMARY OF THE INVENTION

It is thus an object of the present invention to eliminate the manual operation of stud tensioning devices.

It is another object of the invention to increase the efficiency of the method for fastening and loosening the upper cover of a nuclear reactor vessel to the vessel body.

These and other objects of the present invention are realized by the automation of the stud tensioning operation. A plurality of stud tensioning devices are simultaneously controlled by a central controller which transmits control signals indicative of each operative step. When a particular operative step is completed, each tensioning device produces an output signal which is sensed by the controller, which then produces signals indicative of the next operative step. The controller includes a sequence processor for generating a common command signal for the plurality of stud tensioning devices so that the controls of the devices are simultaneously attained, and a plurality of adjustors each for receiving the command signal from the sequence processor and for feeding it only to the corresponding stud tensioning device. The release timing of the adjustor is the time of completion of the operation of the associated tensioner and is independent of the other stud tensioning devices and of the sequence processor. If one of the tensioning devices does not operate, it does not produce an output signal. As a result, the remaining devices are deactivated and the inoperative device is either operated manually or is repaired.

BRIEF DESCRIPTION OF THE DRAWINGS

The operation and structure of the present invention will become more apparent upon a detailed description of a preferred embodiment thereof. In the description to follow, reference will be made to the accompanying drawings, in which:

FIG. 1A is a flowchart of the manual control method of the prior art;

FIG. 1B is a flowchart of the automatic control method of the invention; and

DETAILED DESCRIPTION OF THE PREFERRED EMBODIMENT

Figure 2:
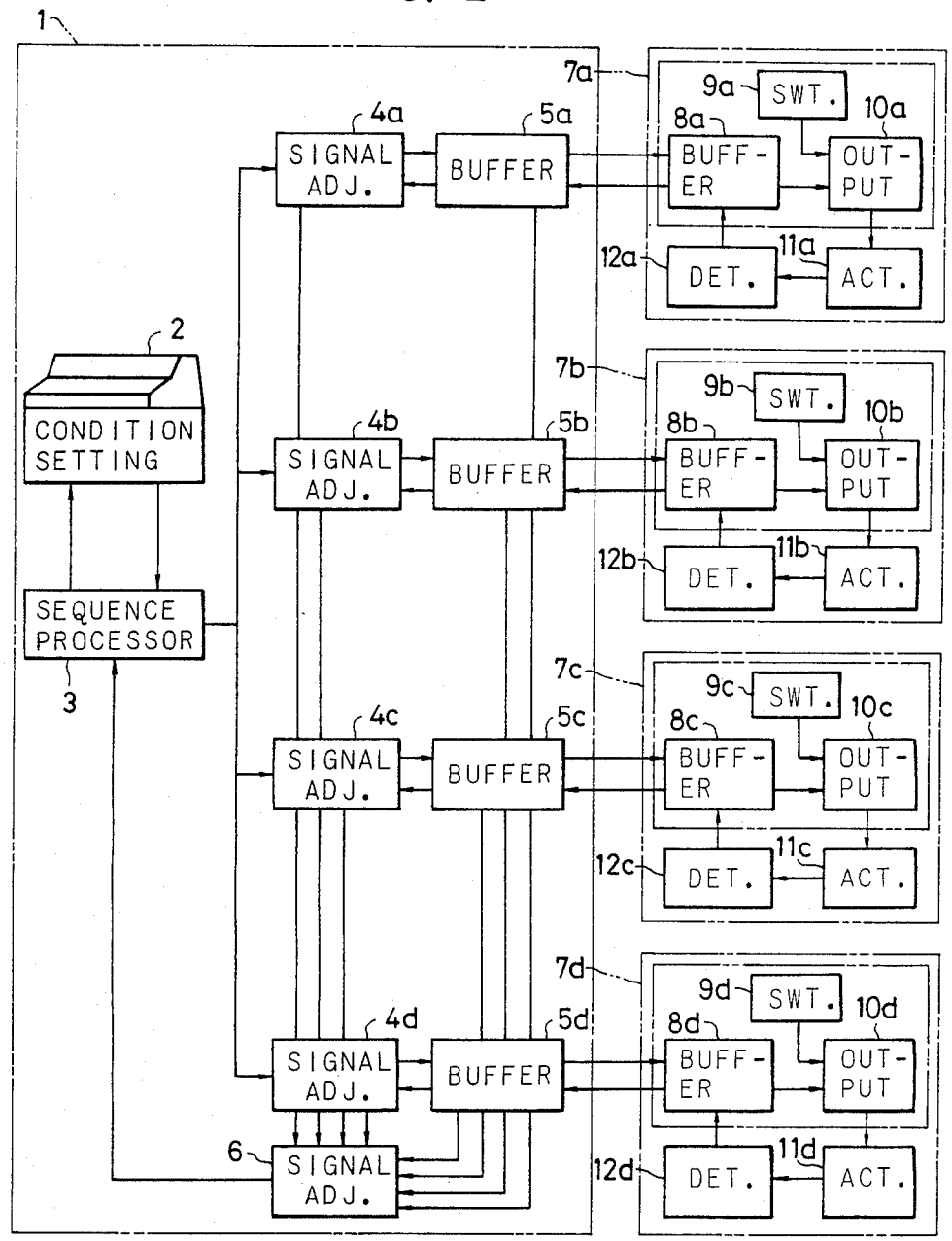
FIG. 2 is a block diagram of the preferred embodiment of the invention.

The automatic control of the invention for controlling the stud tensioning devices is shown generally in the flowchart of FIG. 1B. Note that once automatic control is initiated, no signalling between the pump unit and the tensioners is needed (as it was in FIG. 1A) simply because the human tensioners are replaced in the present invention by electrical signalling equipment. This greatly decreases the operating time of the stud tensioning devices, while eliminating operator fatigue.

With reference to FIG. 2, the preferred embodiment of the present invention is shown in block form. A central control device 1 has a condition setting unit 2, a sequence processing unit 3, four signal adjustors 4a, 4b, 4c, 4d with buffers 5a, 5b, 5c, 5d respectively, and a common signal adjustor 6, all of which are connected as shown for signal transmission. The buffers 5a, 5b, 5c, 5d are connected to buffers 8a, 8b, 8c, 8d within the stud tensioning devices 7a, 7b, 7c, 7d, respectively. The buffers 5a, 5b, 5c, 5d and the buffers 8a, 8b, 8c, 8d may comprise multiple transmitter/receiver for multiple transmission over a reduced number of transmission lines. The stud tensioning devices 7a, 7b, 7c, 7d are of identical construction and include respectively buffers 8a, 8b, 8c, 8d, manually-operated switches 9a, 9b, 9c, 9d, output units 10a, 10b, 10c, 10d, stud tensioning device actuators 11a, 11b, 11c, 11d such as motors, and detectors 12a, 12b, 12c, 12d. The output units 10a, 10b, 10c, 10d are supplied with signals from both the buffers 8a, 8b, 8c, 8d and the manually-operated switches 9a, 9b, 9c, 9d, respectively. The units 10a-10d deliver operating signals to the stud tensioning device actuators 11a, 11b, 11c, 11d, respectively. The output units 10a, 10b, 10c, 10d comprise solid-state relays (SSRs) capable of zero-crossing detection for preventing surge noise from being generated upon a switching operation. The detectors 12a, 12b, 12c, 12d detect when the operation of the stud tensioning device actuators 11a, 11b, 11c, 11d is completed. The detectors 12a-12d then supply signals indicative of such detection to the buffers 8a, 8b, 8c, 8d, respectively.

In operation, when the sequence processing unit 3 is supplied with start signals from both the condition setting unit 2 and the common signal adjustor 6, the sequence processing unit 3 is rendered responsive to the signal from the condition setting unit 2 for transmitting a first step operation command to the signal adjustors 4a, 4b, 4c, 4d simultaneously. The first step operation commands are delivered through the buffers 5a, 5b, 5c, 5d and the buffers 8a, 8b, 8c, 8d to the output units 10a, 10b, 10c, 10d of stud tensioning devices 7a, 7b, 7c, 7d, respectively. The output units 10a, 10b, 10c, 10d operate the stud tensioning device actuators 11a, 11b, 11c, 11d, based on the transmitted operation commands, to both tension the studs and turn the nuts thereon to present positions. when the first operative step of the stud tensioning device actuators 11a, 11b, 11c, 11d is completed, this condition is sensed by the detectors 12a, 12b, 12c, 12d, respectively, and signals representative of the completion of the operation are sent through the buffers 8a, 8b, 8c, 8d and the buffers 5a, 5b, 5c, 5d to the signal adjustors 4a, 4b, 4c, 4d, respectively. When the operation completion signals are supplied to the signal adjustors 4a, 4b, 4c, 4d, their first step operation is brought to an end. A first step completion signal is generated when either a step completion signal is supplied from each of the buffers 5a, 5b, 5c, 5d to the common signal adjustor 6, or when a step completion signal produced by processing the signals through counters, timers or the like in the signal adjustors 4a, 4b, 4c, 4d is sent to the common signal adjustor 6. When a first step completion signal is produced by the common signal adjustor 6, this signal is delivered to the sequence processing unit 3 as a signal indicative of completion of the first step by all of the stud tensioning devices. Upon reception of such a signal, the sequence processing unit 3 delivers an operation command for a second step in the operation to the signal adjustors 4a, 4b, 4c, and 4d, this command being based upon the signal from the condition setting unit 2. The foregoing operations are repeated to execute commands for each of the steps of the overall stud tensioning operation.

If one of the stud tensioning devices (for example, the stud tensioning device 7b) is delayed in its operation, its detector 12b does not produce an operation completion signal. As a consequence, no step completion signal is delivered from the signal adjustor 4b to the common signal adjustor 6. Since the common signal adjustor 6 generates the step completion signal only when step completion signals are supplied from all the signal adjustors 4a, 4b, 4c, 4d, no signal is transmitted to the sequence processing unit 3, and thus the processing unit 3 does not produce an operation command for a next step. The other stud tensioning devices 7a, 7c, 7d cease operating as they complete the particular operative step and "wait" for the operation of the stud tensioning device 7b to be completed. When the operation of the stud tensioning device 7b is completed manually, the stud tensioning devices 7a–7d start operating in the next step as described above. Accordingly, the stud tensioning devices 7a, 7c, 7d remain deactivated while the stud tensioning device 7b is being delayed in operation, and thus the devices cannot be damaged either electrically or mechanically while the other tensioning device is down. A malfunctioning stud tensioning device may be manually operated by actuating the manually-operated switches 9a, 9b, 9c and 9d.

While in the illustrated embodiment four stud tensioning devices are described, the present invention is applicable to any desired number of stud tensioning devices.

With the arrangement of the present invention, as described above, a plurality of stud tensioning devices have stud tensioning device actuators, output units for operating the stud tensioning device actuators, detectors for detecting completion of operation of the stud tensioning device actuators, and first buffers for receiving operation commands and delivering them to the output units and for sending signals from the detectors. A central control device is disclosed which has a condition setting unit, a sequence processing unit, a plurality of as many signal adjustors as stud tensioning devices, second buffers respectively for the signal adjustors, and a common signal adjustor. The first and second buffers are interconnected such that the common signal adjustor supplies the sequence processing unit with a signal indicative of step completion of all the stud tensioning devices. The step completion signal is only generated when signals indicative of completion of operation of the stud tensioning devices are supplied from the detectors of each of the stud tensioning devices through the first buffers to the second buffers.

The present invention discloses a control structure by which the stud tensioning devices can be automatically and simultaneously controlled by a central control device which is located remotely from a source of radiation. By the use of the present invention, operator exposure to radiation can be reduced to zero and the cycle time of the operation can be minimized. These advantages are more clearly shown in Table 1:

TABLE 1

| COMPARISON BETWEEN CONVENTIONAL MANUAL STUD TENSIONING CONTROL AND THE AUTOMATIC CONTROL OF THE INVENTION | | | | | |
|---|---|---|---|---|---|
| TENSIONER TYPE | CONTROL TYPE | CREW PER TENSIONER | *CYCLE TIME (minute/stud) | OPERATOR EXPOSURE (man-hour/stud) | OPERATOR FATIGUE |
| SCREW-ON TYPE | MANUAL CONTROL | 2 | 12.5 | 0.35 | Very much |
| | AUTOMATIC (THIS INVENTION) | 0 | 3.5 | 0 | Impossible |
| QD TYPE (Known Commercial Device) | MANUAL CONTROL | 1 | 2.5 | 0.17 | A little |
| | AUTOMATIC (THIS INVENTION) | 0 | 2.0 | 0 | Impossible |

*CYCLE TIME does not account for the transit time (tensioner - pickup - movement - descent), which is assumed to be approximately equal for each type of control.

Another advantage of the automatic control of the invention is that the stud tensioning devices are deactivated as shown as one of them malfunctions. Thus, even with different speeds of operation, stud tensioning devices which have been deactivated earlier than the other stud tensioning devices are prevented from being electrically or mechanically damaged. When one or more of the stud tensioning devices malfunctions, the other stud tensioning devices remain deactivated at the last step of operation. Under this condition, if the control is started without temporarily stopping the automatic operation, the automatic control is abruptly continued, which is dangerous. Therefore, a suitable automatic control temporary stopping signal is produced, and thereafter, necessary corrective actions are conducted. In this state, if necessary, the malfunctioning tension device may be switched to the manual operation. Then, the temporary stopping signal is released. In such a way, both the cause of the malfunctioning can be ascertained and any corrective actions can be easily completed. Subsequently, the stud tensioning devices may be automatically operated from the last step in which they have stopped operating.

The following advantages are offered by the invention.

(i) Inherent Protection for Mechanical Drive Means

Since a particular signal adjustor is to impart an optimum time period command signal to an associated tensioner, an undue driving force is not applied to the tensioner which is stalled. This protects the mechanical drive means therefor. The service life of each electric means may be elongated.

(ii) Early Finding-out of Defects

Even if any one of the tensioners is inoperative due to malfunction or defect, the others are not operative. It is therefore easy to find out the malfunction or defect and to achieve quick suitable corrective actions.

(iii) Selectable Control for Entire System

The control operation for the entire system can readily be switched over between the temporary stopping mode and the continuous operational mode.

(iv) Selectable Control for Each Tensioner

The tensioner having malfunction and defect is removed electrically, and the other normally operative tensioners are automatically operated. Thereafter, the tensioner having the malfunction and defect may be examined.

What is claimed is:

1. An apparatus for automatically controlling a plurality of stud tensioning devices by sequentially transmitting a plurality of control signals thereto, said plurality of control signals indicating a plurality of operative steps to be completed by each of said stud tensioning devices, said plurality of stud tensioning devices receiving each control signal simultaneously, each of said stud tensioning devices being disabled, upon completion of each of said operative steps, independently from the other said stud tensioning devices, said apparatus comprising:

a central control means for sequentially outputting a plurality of control signals;

a plurality of stud tensioning devices, each of said stud tensioning devices receiving each of said control signals, each of said stud tensioning devices producing a step completion signal upon the completion of any given operative step indicated by a given control signal;

said central control means outputting a subsequent control signal only when it receives said step completion signal from each of said stud tensioning devices.

2. The apparatus for controlling a plurality of stud tensioning devices as recited in claim 1, wherein each of said stud tensioning devices comprises stud tensioning device actuators, an output unit for operating said stud tensioning device actuators, detectors for detecting the completion of an operative step of said stud tensioning device actuators, and a first buffer for receiving said control signals from said central control means and for delivering said control signals to said output units and for sending said step completion signal from each of said detectors to said central control means.

3. The apparatus for controlling a plurality of stud tensioning devices as recited in claim 2, wherein said central control means comprises a condition setting unit, a sequence processing unit, a plurality of signal adjustors, second buffers respectively for each of said signal adjustors, and a common signal adjustor, said first and second buffers being interconnected so that said common signal adjustor supplies said sequence processing unit with a common signal indicative of the completion of a given operative step by all of said stud tensioning devices only when each said step completion signal from each of said stud tensioning devices is supplied by each of said detectors thereof through respective said first buffers and said respective second buffers to said common signal adjustor, said sequence processing unit being responsive to an input signal from said condition setting unit for supplying said signal adjustors with said subsequent control signal indicating a next operative step only when said sequence processing unit is supplied with said common step completion signal from said common signal adjustor.

4. The apparatus for automatically controlling a plurality of stud tensioning devices as recited in claim 3, wherein each of said signal adjustors is disabled upon completion of each of said operative steps independently from said sequence processing unit.

5. The apparatus for automatically controlling a plurality of stud tensioning devices as recited in claim 3, wherein said common signal adjustor receives step completion signals from both of said plurality of second buffers and said plurality of signal adjustors.

* * * * *